United States Patent
Agarwal et al.

(10) Patent No.: US 8,644,355 B2
(45) Date of Patent: *Feb. 4, 2014

(54) METHODS, SYSTEMS, AND COMPUTER READABLE MEDIA FOR MODIFYING A DIAMETER SIGNALING MESSAGE DIRECTED TO A CHARGING FUNCTION NODE

(75) Inventors: Devesh Agarwal, Raleigh, NC (US);
Peter J. Marsico, Chapel Hill, NC (US)

(73) Assignee: Tekelec, Inc., Morrisville, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/336,132

(22) Filed: Dec. 23, 2011

(65) Prior Publication Data

US 2012/0163297 A1   Jun. 28, 2012

Related U.S. Application Data

(60) Provisional application No. 61/426,841, filed on Dec. 23, 2010.

(51) Int. Cl.
*H04M 11/00*   (2006.01)
(52) U.S. Cl.
USPC .......................................................... 370/522
(58) Field of Classification Search
USPC .......................................................... 370/522
See application file for complete search history.

(56) References Cited

U.S. PATENT DOCUMENTS

| | | |
|---|---|---|
| 4,310,727 A | 1/1982 | Lawser |
| 4,754,479 A | 6/1988 | Bicknell et al. |
| 5,089,954 A | 2/1992 | Rago |
| 5,237,604 A | 8/1993 | Ryan |
| 5,247,571 A | 9/1993 | Kay et al. |
| 5,251,248 A | 10/1993 | Tokunaga et al. |
| 5,400,390 A | 3/1995 | Salin |
| 5,420,916 A | 5/1995 | Sekiguchi |
| 5,422,941 A | 6/1995 | Hasenauer et al. |
| 5,423,068 A | 6/1995 | Hecker |
| 5,430,719 A | 7/1995 | Weisser, Jr. |
| 5,442,683 A | 8/1995 | Hoogeveen |
| 5,455,855 A | 10/1995 | Hokari |

(Continued)

FOREIGN PATENT DOCUMENTS

| | | |
|---|---|---|
| CN | 200780017383.1 | 11/2011 |
| CN | ZL200680051295.9 | 3/2013 |

(Continued)

OTHER PUBLICATIONS

U.S. Appl. No. 61/291,961, filed Jan. 4, 2010, pp. 1-7.*

(Continued)

*Primary Examiner* — Melvin Marcelo
(74) *Attorney, Agent, or Firm* — Jenkins, Wilson, Taylor & Hunt, P.A.

(57) ABSTRACT

Methods, systems, and computer readable media for modifying a Diameter signaling message directed to a charging function node are disclosed. In one example, the method comprises receiving, at a Diameter routing node, a Diameter signaling message that is associated with a mobile subscriber and is directed to a destination charging function node. The method further includes accessing mobile subscriber related information that is associated with the Diameter signaling message. The method also includes modifying the Diameter signaling message to include the mobile subscriber related information and routing the modified Diameter message to the destination charging function node.

29 Claims, 8 Drawing Sheets

(56) References Cited

U.S. PATENT DOCUMENTS

| | | |
|---|---|---|
| 5,457,736 A | 10/1995 | Cain et al. |
| 5,475,732 A | 12/1995 | Pester, III |
| 5,481,603 A | 1/1996 | Gutierrez et al. |
| 5,502,726 A | 3/1996 | Fischer |
| 5,504,804 A | 4/1996 | Widmark et al. |
| 5,526,400 A | 6/1996 | Nguyen |
| 5,579,372 A | 11/1996 | Aströ |
| 5,590,398 A | 12/1996 | Matthews |
| 5,594,942 A | 1/1997 | Antic et al. |
| 5,623,532 A | 4/1997 | Houde et al. |
| 5,689,548 A | 11/1997 | Maupin et al. |
| 5,706,286 A | 1/1998 | Reiman et al. |
| 5,711,002 A | 1/1998 | Foti |
| 5,799,073 A | 8/1998 | Fleischer, III et al. |
| 5,802,145 A | 9/1998 | Farris et al. |
| 5,812,639 A | 9/1998 | Bartholomew et al. |
| 5,819,178 A | 10/1998 | Cropper |
| 5,822,694 A | 10/1998 | Coombes et al. |
| 5,832,382 A | 11/1998 | Alperovich |
| 5,841,854 A | 11/1998 | Schumacher et al. |
| 5,852,660 A | 12/1998 | Lindquist et al. |
| 5,854,982 A | 12/1998 | Chambers et al. |
| 5,862,481 A | 1/1999 | Kulkarni et al. |
| 5,867,788 A | 2/1999 | Joensuu |
| 5,878,347 A | 3/1999 | Joensuu et al. |
| 5,878,348 A | 3/1999 | Foti |
| 5,889,849 A | 3/1999 | Ban et al. |
| 5,890,063 A | 3/1999 | Mills |
| 5,903,726 A | 5/1999 | Donovan et al. |
| 5,915,222 A | 6/1999 | Olsson et al. |
| 5,953,662 A | 9/1999 | Lindquist et al. |
| 5,953,663 A | 9/1999 | Maupin et al. |
| 5,983,217 A | 11/1999 | Khosravi-Sichannie et al. |
| 5,995,822 A | 11/1999 | Smith et al. |
| 6,006,098 A | 12/1999 | Rathnasabapathy et al. |
| 6,011,803 A | 1/2000 | Bicknell et al. |
| 6,014,557 A | 1/2000 | Morton et al. |
| 6,018,657 A | 1/2000 | Kennedy, III et al. |
| 6,038,456 A | 3/2000 | Colby et al. |
| 6,049,714 A | 4/2000 | Patel |
| 6,078,584 A | 6/2000 | Mottishaw et al. |
| 6,094,578 A | 7/2000 | Purcell et al. |
| 6,097,960 A | 8/2000 | Rathnasabapathy et al. |
| 6,115,463 A | 9/2000 | Coulombe et al. |
| 6,122,352 A | 9/2000 | Kangas et al. |
| H1895 H | 10/2000 | Hoffpauir et al. |
| 6,128,377 A | 10/2000 | Sonnenberg |
| 6,134,441 A | 10/2000 | Äström et al. |
| 6,134,447 A | 10/2000 | Havinis et al. |
| 6,137,806 A | 10/2000 | Martinez |
| 6,138,007 A | 10/2000 | Bharatia |
| 6,138,016 A | 10/2000 | Kulkarni et al. |
| 6,138,017 A | 10/2000 | Price et al. |
| 6,138,023 A | 10/2000 | Agarwal et al. |
| 6,144,857 A | 11/2000 | Price et al. |
| 6,148,204 A | 11/2000 | Urs et al. |
| 6,175,743 B1 | 1/2001 | Alperovich et al. |
| 6,178,181 B1 | 1/2001 | Glitho |
| 6,185,414 B1 | 2/2001 | Brunner et al. |
| 6,188,752 B1 | 2/2001 | Lesley |
| 6,192,242 B1 | 2/2001 | Rollender |
| 6,205,210 B1 | 3/2001 | Rainey et al. |
| 6,208,870 B1 | 3/2001 | Lorello et al. |
| 6,208,872 B1 | 3/2001 | Schmidt |
| 6,226,517 B1 | 5/2001 | Britt et al. |
| 6,236,365 B1 | 5/2001 | LeBlanc et al. |
| 6,263,212 B1 | 7/2001 | Ross et al. |
| 6,292,669 B1 | 9/2001 | Meuronen et al. |
| 6,298,232 B1 | 10/2001 | Marin et al. |
| 6,308,075 B1 | 10/2001 | Irten et al. |
| 6,324,279 B1 | 11/2001 | Kalmanek et al. |
| 6,327,350 B1 | 12/2001 | Spangler et al. |
| 6,338,140 B1 | 1/2002 | Owens et al. |
| 6,356,529 B1 | 3/2002 | Zarom |
| 6,363,431 B1 | 3/2002 | Hammer et al. |
| 6,373,930 B1 | 4/2002 | McConnell et al. |
| 6,377,674 B1 | 4/2002 | Chong et al. |
| 6,377,807 B1 | 4/2002 | Iparrea et al. |
| 6,393,269 B1 | 5/2002 | Hartmaier et al. |
| 6,411,632 B2 | 6/2002 | Lindgren et al. |
| 6,421,674 B1 | 7/2002 | Yoakum et al. |
| 6,424,832 B1 | 7/2002 | Britt et al. |
| 6,434,127 B1 | 8/2002 | Ha |
| 6,453,158 B2 | 9/2002 | Donovan et al. |
| 6,453,174 B1 | 9/2002 | Cunningham et al. |
| 6,463,055 B1 | 10/2002 | Lupien et al. |
| 6,480,588 B1 | 11/2002 | Donovan |
| 6,493,551 B1 | 12/2002 | Wang et al. |
| 6,496,690 B1 | 12/2002 | Cobo et al. |
| 6,505,046 B1 | 1/2003 | Baker |
| 6,512,926 B1 | 1/2003 | Henry-Labordere |
| 6,515,997 B1 | 2/2003 | Feltner et al. |
| 6,516,194 B2 | 2/2003 | Hanson |
| 6,519,242 B1 | 2/2003 | Emery et al. |
| 6,519,468 B1 | 2/2003 | Donovan et al. |
| 6,529,524 B1 | 3/2003 | Liao et al. |
| 6,535,727 B1 | 3/2003 | Abbasi et al. |
| 6,535,746 B1 | 3/2003 | Yu et al. |
| 6,560,216 B1 | 5/2003 | McNiff et al. |
| 6,560,456 B1 | 5/2003 | Lohtia et al. |
| 6,574,481 B1 | 6/2003 | Rathnasabapathy et al. |
| 6,577,723 B1 | 6/2003 | Mooney |
| 6,584,183 B2 | 6/2003 | Manto |
| 6,594,258 B1 | 7/2003 | Larson et al. |
| 6,611,516 B1 | 8/2003 | Pirkola et al. |
| 6,615,037 B1 | 9/2003 | Bharatia et al. |
| 6,625,461 B1 | 9/2003 | Bertacchi |
| 6,633,764 B1 | 10/2003 | Garcia |
| 6,643,511 B1 | 11/2003 | Rune et al. |
| 6,662,017 B2 | 12/2003 | McCann et al. |
| 6,683,881 B1 | 1/2004 | Mijares et al. |
| 6,684,073 B1 | 1/2004 | Joss et al. |
| 6,694,153 B1 | 2/2004 | Campbell et al. |
| 6,697,620 B1 | 2/2004 | Lamb et al. |
| 6,731,926 B1 | 5/2004 | Link, II et al. |
| 6,738,636 B2 | 5/2004 | Lielbriedis |
| 6,745,041 B2 | 6/2004 | Allison et al. |
| 6,795,701 B1 | 9/2004 | Baker et al. |
| 6,801,781 B1 | 10/2004 | Provost et al. |
| 6,819,932 B2 | 11/2004 | Allison et al. |
| 6,826,397 B1 | 11/2004 | Vasa |
| 6,836,477 B1 | 12/2004 | West, Jr. et al. |
| 6,850,768 B2 | 2/2005 | Foll |
| 6,856,676 B1 | 2/2005 | Pirot et al. |
| 6,865,191 B1 | 3/2005 | Bengtsson et al. |
| 6,885,872 B2 | 4/2005 | McCann et al. |
| 6,912,389 B2 | 6/2005 | Bright et al. |
| 6,917,612 B2 | 7/2005 | Foti et al. |
| 6,950,441 B1 | 9/2005 | Kaczmarczyk et al. |
| 6,975,852 B1 | 12/2005 | Sofer et al. |
| 6,993,038 B2 | 1/2006 | McCann |
| 7,035,239 B2 | 4/2006 | McCann et al. |
| 7,039,037 B2 | 5/2006 | Wang et al. |
| 7,043,002 B2 | 5/2006 | Delaney et al. |
| 7,079,524 B2 | 7/2006 | Bantukul et al. |
| 7,079,853 B2 | 7/2006 | Rathnasabapathy et al. |
| 7,092,505 B2 | 8/2006 | Allison et al. |
| 7,113,795 B2 | 9/2006 | Somani et al. |
| 7,113,800 B2 | 9/2006 | Linkola |
| 7,145,875 B2 | 12/2006 | Allison et al. |
| 7,177,398 B2 | 2/2007 | Meer et al. |
| 7,177,399 B2 | 2/2007 | Dawson et al. |
| 7,181,194 B2 | 2/2007 | McCann et al. |
| 7,190,959 B2 | 3/2007 | Palmer et al. |
| 7,221,929 B2 | 5/2007 | Lee et al. |
| 7,221,952 B2 | 5/2007 | Cho et al. |
| 7,254,391 B2 | 8/2007 | McCann |
| 7,257,401 B1 | 8/2007 | Dizdarevic et al. |
| 7,274,683 B2 | 9/2007 | Segal |
| 7,286,839 B2 | 10/2007 | McCann et al. |
| 7,292,592 B2 | 11/2007 | Rune |
| 7,310,415 B1 | 12/2007 | Short |
| 7,346,022 B1 | 3/2008 | Roy |
| 7,366,945 B2 | 4/2008 | Wang et al. |

(56) References Cited

U.S. PATENT DOCUMENTS

| | | |
|---|---|---|
| 7,397,773 B2 | 7/2008 | Qu et al. |
| 7,453,876 B2 | 11/2008 | Hua et al. |
| 7,466,807 B2 | 12/2008 | McCann et al. |
| 7,551,608 B1 | 6/2009 | Roy |
| 7,551,926 B2 | 6/2009 | Rune |
| 7,627,331 B2 | 12/2009 | Winterbottom et al. |
| 7,668,543 B2 | 2/2010 | Müller |
| 7,729,485 B2 | 6/2010 | Koskinen et al. |
| 7,746,864 B1 | 6/2010 | Asawa et al. |
| 7,764,947 B2 | 7/2010 | Koskinen et al. |
| 7,801,116 B2 | 9/2010 | Westman |
| 7,844,745 B1 | 11/2010 | Darbyshire et al. |
| 7,848,767 B2 | 12/2010 | McCann et al. |
| 7,855,982 B2 | 12/2010 | Ramankutty et al. |
| 7,876,744 B2 | 1/2011 | Kwon |
| 7,889,716 B2 | 2/2011 | Tejani et al. |
| 7,894,353 B2 | 2/2011 | Li et al. |
| 7,916,857 B2 | 3/2011 | Palmer et al. |
| 7,936,866 B2 | 5/2011 | McCann |
| 7,962,120 B2 | 6/2011 | Cai et al. |
| 8,041,349 B2 | 10/2011 | Fukui et al. |
| 8,139,735 B2 | 3/2012 | Cai et al. |
| 8,195,161 B2 | 6/2012 | Bumiller |
| 8,208,461 B2 | 6/2012 | Mitchell |
| 8,213,411 B2 | 7/2012 | Ayers et al. |
| 8,391,833 B2 | 3/2013 | Agarwal |
| 2001/0006897 A1 | 7/2001 | Kang et al. |
| 2001/0029182 A1 | 10/2001 | McCann et al. |
| 2001/0030957 A1 | 10/2001 | McCann et al. |
| 2001/0040957 A1 | 11/2001 | McCann et al. |
| 2001/0046856 A1 | 11/2001 | McCann |
| 2002/0029189 A1 | 3/2002 | Titus et al. |
| 2002/0071530 A1 | 6/2002 | Hannigan |
| 2002/0111153 A1 | 8/2002 | Hartmaier et al. |
| 2002/0132636 A1 | 9/2002 | Stockhusen |
| 2002/0147845 A1 | 10/2002 | Sanchez-Herrero et al. |
| 2002/0150079 A1 | 10/2002 | Zabawskyj et al. |
| 2002/0173320 A1 | 11/2002 | Aitken et al. |
| 2002/0176382 A1 | 11/2002 | Madour et al. |
| 2003/0003930 A1 | 1/2003 | Allison et al. |
| 2003/0007482 A1 | 1/2003 | Khello et al. |
| 2003/0016684 A1 | 1/2003 | Prasad et al. |
| 2003/0026289 A1 | 2/2003 | Mukherjee et al. |
| 2003/0054844 A1 | 3/2003 | Anvekar et al. |
| 2003/0061234 A1 | 3/2003 | Ali et al. |
| 2003/0065788 A1 | 4/2003 | Salomaki |
| 2003/0081754 A1 | 5/2003 | Esparza et al. |
| 2003/0091170 A1 | 5/2003 | McCann et al. |
| 2003/0109271 A1 | 6/2003 | Lewis et al. |
| 2003/0157938 A1 | 8/2003 | Haase et al. |
| 2003/0190913 A1 | 10/2003 | Coad et al. |
| 2003/0193967 A1 | 10/2003 | Fenton et al. |
| 2003/0203740 A1 | 10/2003 | Bahl et al. |
| 2003/0227899 A1 | 12/2003 | McCann |
| 2004/0076126 A1 | 4/2004 | Qu et al. |
| 2004/0081206 A1 | 4/2004 | Allison et al. |
| 2004/0082332 A1 | 4/2004 | McCann et al. |
| 2004/0087300 A1 | 5/2004 | Lewis |
| 2004/0125925 A1 | 7/2004 | Marsot |
| 2004/0132451 A1 | 7/2004 | Butehorn et al. |
| 2004/0142707 A1 | 7/2004 | Midkiff et al. |
| 2004/0166878 A1 | 8/2004 | Erskine et al. |
| 2004/0184594 A1 | 9/2004 | Schmechel et al. |
| 2004/0198351 A1 | 10/2004 | Knotts |
| 2004/0202187 A1 | 10/2004 | Kelly et al. |
| 2004/0203641 A1 | 10/2004 | Hazlewood |
| 2004/0203914 A1 | 10/2004 | Kall et al. |
| 2004/0213393 A1 | 10/2004 | Bedingfield et al. |
| 2004/0219935 A1 | 11/2004 | McCann et al. |
| 2004/0233840 A1 | 11/2004 | Bye |
| 2004/0240638 A1 | 12/2004 | Donovan |
| 2004/0246965 A1 | 12/2004 | Westman et al. |
| 2004/0264674 A1 | 12/2004 | Delaney et al. |
| 2005/0003838 A1 | 1/2005 | McCann et al. |
| 2005/0111641 A1 | 5/2005 | Koskinen et al. |
| 2005/0119017 A1 | 6/2005 | Lovell, Jr. et al. |
| 2005/0197105 A1 | 9/2005 | McCann |
| 2005/0238048 A1 | 10/2005 | Delaney et al. |
| 2006/0020680 A1 | 1/2006 | Emberty et al. |
| 2006/0034256 A1 | 2/2006 | Addagatla et al. |
| 2006/0050680 A1 | 3/2006 | Naim et al. |
| 2006/0067338 A1 | 3/2006 | Hua et al. |
| 2006/0077926 A1 | 4/2006 | Rune |
| 2006/0098621 A1 | 5/2006 | Plata et al. |
| 2006/0136557 A1 | 6/2006 | Schaedler et al. |
| 2006/0172730 A1 | 8/2006 | Matsuda |
| 2006/0221972 A1 | 10/2006 | Bhargava et al. |
| 2006/0240819 A1 | 10/2006 | Xu et al. |
| 2006/0252425 A1 | 11/2006 | Jiang |
| 2006/0258329 A1 | 11/2006 | Gruchala et al. |
| 2006/0274744 A1 | 12/2006 | Nagai et al. |
| 2006/0281492 A1 | 12/2006 | Jiang |
| 2007/0042779 A1 | 2/2007 | Eikkula |
| 2007/0047539 A1 | 3/2007 | Agarwal et al. |
| 2007/0061397 A1 | 3/2007 | Gregorat et al. |
| 2007/0066326 A1 | 3/2007 | Agarwal et al. |
| 2007/0104184 A1 | 5/2007 | Ku et al. |
| 2007/0209061 A1 | 9/2007 | Dekeyzer et al. |
| 2007/0230680 A1 | 10/2007 | McCann |
| 2007/0254681 A1 | 11/2007 | Horvath et al. |
| 2007/0258575 A1 | 11/2007 | Douglas et al. |
| 2007/0263565 A1 | 11/2007 | Roy |
| 2007/0286367 A1 | 12/2007 | McCann et al. |
| 2007/0288655 A1 | 12/2007 | Price et al. |
| 2007/0297419 A1 | 12/2007 | Askerup et al. |
| 2008/0039104 A1 | 2/2008 | Gu et al. |
| 2008/0176538 A1 | 7/2008 | Terrill et al. |
| 2008/0233931 A1 | 9/2008 | Shim |
| 2008/0248820 A1 | 10/2008 | Lohtia |
| 2009/0003388 A1 | 1/2009 | Florkey et al. |
| 2009/0080440 A1 | 3/2009 | Balyan et al. |
| 2009/0129271 A1 | 5/2009 | Ramankutty et al. |
| 2009/0227276 A1 | 9/2009 | Agarwal et al. |
| 2009/0232011 A1 | 9/2009 | Li et al. |
| 2010/0113016 A1 | 5/2010 | Gayde et al. |
| 2010/0217858 A1 | 8/2010 | Przybysz et al. |
| 2010/0250662 A1 | 9/2010 | Agarwal et al. |
| 2010/0278041 A1 | 11/2010 | Shi |
| 2010/0299451 A1 | 11/2010 | Yigang et al. |
| 2011/0067085 A1 | 3/2011 | Brouard |
| 2011/0075675 A1 | 3/2011 | Koodli et al. |
| 2011/0116378 A1 | 5/2011 | Ramankutty et al. |
| 2011/0116382 A1 | 5/2011 | McCann et al. |
| 2011/0200053 A1 | 8/2011 | Kanode et al. |
| 2011/0202612 A1 | 8/2011 | Craig et al. |
| 2011/0202614 A1 | 8/2011 | Graig et al. |
| 2011/0202676 A1 | 8/2011 | Craig et al. |
| 2011/0211527 A1 | 9/2011 | Agarwal et al. |
| 2011/0222532 A1 | 9/2011 | Noldus |
| 2011/0225280 A1 | 9/2011 | Delsesto et al. |
| 2011/0225306 A1 | 9/2011 | Delsesto et al. |
| 2011/0302244 A1 | 12/2011 | McCann et al. |
| 2011/0314178 A1 | 12/2011 | Kanode et al. |
| 2012/0034900 A1* | 2/2012 | Agarwal ............ 455/406 |
| 2012/0099715 A1 | 4/2012 | Ravishankar et al. |
| 2012/0155389 A1 | 6/2012 | McNamee et al. |
| 2012/0202550 A1* | 8/2012 | Marsico ............ 455/515 |
| 2012/0224524 A1* | 9/2012 | Marsico ............ 370/315 |
| 2012/0287844 A1* | 11/2012 | Ophir et al. ............ 370/315 |
| 2013/0157620 A1 | 6/2013 | Marsico |

FOREIGN PATENT DOCUMENTS

| | | |
|---|---|---|
| EP | 0 512 962 A2 | 11/1992 |
| EP | 0 788 283 A2 | 8/1997 |
| EP | 0 936 825 A3 | 8/1999 |
| EP | 0 944 276 A1 | 9/1999 |
| EP | 1 558 004 A | 7/2005 |
| EP | 1 742 452 A1 | 1/2007 |
| EP | 1 950 942 A1 | 7/2008 |
| GB | 2 382 267 | 5/2003 |
| KR | 10-2004-0107271 A | 12/2004 |
| WO | WO 95/12292 A1 | 5/1995 |
| WO | WO 96/11557 | 4/1996 |

(56) References Cited

FOREIGN PATENT DOCUMENTS

| | | |
|---|---|---|
| WO | WO 97/33441 A1 | 9/1997 |
| WO | WO 98/56195 | 12/1998 |
| WO | WO 99/11087 A2 | 3/1999 |
| WO | WO 99/57926 | 11/1999 |
| WO | WO 00/16583 A1 | 3/2000 |
| WO | 01/22761 | 3/2001 |
| WO | WO 01/47297 A2 | 6/2001 |
| WO | WO 01/48981 A1 | 7/2001 |
| WO | WO 01/54444 A1 | 7/2001 |
| WO | 02/054786 A1 | 7/2002 |
| WO | WO 02/060192 A2 | 8/2002 |
| WO | 03/005664 A2 | 1/2003 |
| WO | WO 03/005664 A2 | 1/2003 |
| WO | 03/017697 A1 | 2/2003 |
| WO | WO 03/021982 A1 | 3/2003 |
| WO | 03/103265 A1 | 12/2003 |
| WO | WO 03/105382 A1 | 12/2003 |
| WO | 2004/008786 A1 | 1/2004 |
| WO | WO 2004/006534 | 1/2004 |
| WO | WO 2004/008786 A1 | 1/2004 |
| WO | WO 2004/075507 | 9/2004 |
| WO | WO 2004/102345 A2 | 11/2004 |
| WO | WO 2005/002311 A2 | 1/2005 |
| WO | WO 2005/013538 A3 | 2/2005 |
| WO | 2005/089119 A2 | 9/2005 |
| WO | 2006/031678 A2 | 3/2006 |
| WO | WO 2006/072473 A1 | 7/2006 |
| WO | WO 2007/045991 A1 | 4/2007 |
| WO | 2007/064943 A2 | 6/2007 |
| WO | WO 2007/064943 A2 | 6/2007 |
| WO | WO 2007/092205 A2 | 8/2007 |
| WO | 2007/106563 A2 | 9/2007 |
| WO | WO 2007/146257 A2 | 12/2007 |
| WO | WO 2008/157213 A2 | 12/2008 |
| WO | WO 2009/023573 A2 | 2/2009 |
| WO | WO 2010/111561 A2 | 9/2010 |
| WO | WO 2011/106690 A2 | 9/2011 |
| WO | 2012/119147 A1 | 9/2012 |

OTHER PUBLICATIONS

Notification of Transmittal of the International Search Report and the Written Opinion of the International Searching Authority, or the Declaration for International Application No. PCT/US2011/067130 (Jun. 7, 2012).
Non-Final Offcial Action for U.S. Appl. No. 13/035,656 (Jan. 18, 2012).
U.S. Appl. No. 61/576,213 for "LTE HSS with HLR Proxy Mode for Mobility" (Unpublished, filed Dec. 15, 2011).
Notification of Transmittal of the International Search Report and the Written Opinion of the International Searching Authority, or the Declaration for International Application No. PCT/US2011/026307 (Nov. 15, 2011).
Notification of Transmittal of the International Search Report and the Written Opinion of the International Searching Authority, or the Declaration for International Application No. PCT/US2010/028762 (Oct. 27, 2010).
Notice of Allowance and Fee(s) Due for U.S. Appl. No. 11/706,837 (May 27, 2010).
"Diameter (Protocol)," Wikipedia, pp. 1-8 (Document last modified on Jan. 16, 2010).
Final Official Action for U.S. Appl. No. 11/706,837 (Dec. 15, 2009).
Korhonen et al., "Clarifications on the Routing of Diameter Requests Based on the Username and the Realm," RFC 5729, pp. 1-12 (Dec. 2009).
Interview Summary for U.S. Appl. No. 11/706,837 (Oct. 26, 2009).
Korhonen et al., "Diameter User-Name and Realm Based Request Routing Clarifications," draft-ietf-dime-nai-routing-04.txt, pp. 1-13 (Oct. 6, 2009).
Official Action for U.S. Appl. No. 11/706,837 (May 13, 2009).
3GPP, "Digital Cellular Telecommunications System (Phase 2+); Universal Mobile Telecommunications System (UMTS); LTE; IP Multimedia (IM) Subsystem Cx and Dx Interfaces; Signalling Flows and Message Contents," ETSI TS 129 228 V8.4.0 (Jan. 2009).
Official Action for U.S. Appl. No. 11/706,837 (Jul. 29, 2008).
"3rd Generation Partnership Project; Technical Specifications Group Service and System Aspects; Telecommunication management; Charging management; Diameter charging applications (Release 7)," 3GPP TS 32.299, V7.7.0, pp. 1-120 (Sep. 2007.)
"IP Multimedia Subsystem," printout from wikipedia.org, Wikimedia Foundation, Inc. (May 29, 2007).
Supplementary European Search Report for European application No. 04 756 094.1 (Mar. 29, 2007).
"HP OpenCall Home Subscriber Server Software—Data Sheet", 4AA0-3360ENW Rev. 2, Hewlett-Packard Development Company, L.P. (Jul. 2006).
Camarillo et al., "The Session Initiation Protocol (SIP) P-User-Database Private-Header (P-Header)," Network Working Group, RFC 4457, pp. 1-8 (Apr. 2006).
Liu et al., "Introduction to Diameter," IBM, pp. 1-12 (Jan. 24, 2006).
"Cisco IP Transfer Point as the Signaling Gateway for the Cisco BTS 10200 Softswitch," Cisco Systems, Inc., pp. 1-10 (Summer 2004).
"Cisco IP Transfer Point as the Signaling Gateway for the Cisco PGW 2200 Softswitch," Cisco Systems, Inc., pp. 1-11 (Summer 2004).
"Next-Generation Signaling Transports Cisco IP Transfer Point," Cisco Systems, Inc., pp. 1-27 (Summer 2004).
International Search Report in PCT Application No. 03/32626 (Mar. 5, 2004).
"A Study in Mobile Messaging: The Evolution of Messaging in Mobile Networks, and How to Efficiently and Effectively Manage the Growing Messaging Traffic," White Paper, Cisco Systems, Inc., pp. 1-6 (Spring 2004).
Walker, "The IP Revolution in Mobile Messaging," Packet, Cisco Systems Users Magazine, vol. 16, No. 1, pp. Cover; 73-74; and 89 (First Quarter 2004).
"Cisco ITP Multilayer Routing (MLR) SMS MO Routing Requirements," Cisco Systems, Inc., p. 1 (Copyright 2004).
"Cisco Signaling Gateway Manager Release 3.2 for Cisco IP Transfer Point," Cisco Systems, Inc., pp. 1-9 (Copyright 1992-2004).
"Solutions for Mobile Network Operators," Cisco Systems, Inc., pp. 1-8 (Copyright 1992-2004).
Moodie, "Agilent acceSS7: White Paper," Agilent Technologies, pp. 1-14 (Apr. 1, 2003).
"Cisco IP Transfer Point," Cisco Systems, Inc., pp. 1-10 (Copyright 1992-2003).
"Cisco IP Transfer Point Multilayer Short Message Service Routing Solution," Cisco Systems, Inc., pp. 1-6 (Copyright 1992-2003).
"Cisco ITP MAP Gateway for Public WLAN Slm Authentication and Authorization," Cisco Systems, Inc., pp. 1-13 (Copyright 1992-2003).
Barry, "A Signal for Savings," Packet, Cisco Systems Users Magazine, vol. 14, No. 4, pp. Cover; 19-21; and 81 (Fourth Quarter 2002).
"Agilent Technologies and Cisco Systems SS7 Over IP White Paper," Cisco Systems, Inc. and Agilent and Technologies, pp. 1-6 (Copyright 2002-Printed in the UK Feb. 1, 2002).
"Cisco IP Transfer Point: MTP3 User Adaptation (M3UA) and SCCP User Adaptation (SUA) Signaling Gateway," Cisco Systems, Inc., pp. 1-14 (Copyright 2002).
"Cisco SS7 Port Adapter for the Cisco 7500 Versatile Interface Processor and 7200 VXR Routers Provide High-Density SS7 Agrregation," Cisco Systems, Inc., pp. 1-5 (Copyright 1992-2002).
"Next-Generation SS7 Networks with the Cisco IP Transfer Point," Cisco Systems, Inc., pp. 1-14 (Copyright 1992-2002).
The attached email dated Oct. 20, 2001 and PowerPoint presentation dated Oct. 24, 2001 disclose an MSISDN-based auto-provisioning solution proposed by a customer of the assignee of the presend application.
"Agilent acceSS7 Business intelligence," Agilent Technologies, pp. 1-6 (Copyright 2001-Printed in the UK Nov. 30, 2001).
"Cisco IP Transfer Point (ITP) Network Management Product Presentation," Cisco Systems, Inc., pp. 1-20 (Copyright 2001).
"Networkers," Cisco Systems, Inc., pp. 1-60 (Copyright 2001).
"Cisco SS7 Signaling Offload," Cisco Systems, Inc., pp. 1-33 (Copyright 1992-2001).

(56) References Cited

OTHER PUBLICATIONS

Rockhold, "Or," Wireless Review, p. 22, 23, 26, 28, 30, 32, (Aug. 15, 2000).
Bertrand, "Jambala Mobility Gateway-Convergence and Inter-System Roaming," Ericsson Review, p. 89-93 (1999).
"Topsail Beach-SS7 Over IP-" Cisco Systems, Inc., pp. 1-16 (Copyright 1999).
ETSI, "Digital Cellular Telecommunications Systems (Phase 2+); Support of Mobile Number Portability (MNP); Technical Realisation; Stage 2," Global System for Mobile Communications, p. 1-71, (1998).
Smith, "Number Portability Pileup," Telephony, p. 22, 24, 26, (Jan. 6, 1997).
Jain et al., "Phone Number Portability for PCS Systems with ATM Backbones Using Distributed Dynamic Hashing," IEEE, vol. 15 (No. 1), p. 96-105, (Jan. 1997).
Heinmiller, "Generic Requrements for SCP Application and GTT Function for Number Portability," Illinois Number Portability Workshop, p. 1-50, (Sep. 4, 1996).
International Telecommunication Union, "Series Q: Switching and Signalling: Specifications of Signalling Systems No. 7-Signalling Connection Control Part," p. 11-16, (Jul. 1996).
Rice, "SS7 Networks in a PCS World," Telephony, pp. 138, 140 142, 144, 146, (Jun. 24, 1996).
Tekelec, "Eagle STP Planning Guide", Eagle Network Switching Division, (No. 3), p. i-vii, 1-64, A1-A2, B1-2, (May 1996).
Anonymous, "Generic Switching and Signaling Requirements for Number Portability," AT&T Network Systems, No. 1, p. 1-75, (Feb. 2, 1996).
ETSI, Digital Cellular Telecommunications System (Phase 2+); Mobile Application Part (MAP) Specification, Global System for Mobile Communications, pp. 112-114 (1996).
Jain, et al., "A Hashing Scheme for Phone Number Portability in PCS Systems with ATM Backbones," Bell Communications Research, p. 593-597, (1996).
Bishop, "Freeing the Network for Competition," Telecommunications, p. 75-80, (Apr. 1995).
Anonymous, "Zeichengabesysteme-Eine neue Generation für ISDN and intelligente Netze," Zeichengabesystem, Medien-Institut Bremen, p. iz-xi; 170-176, (Feb. 17, 1995).
Giordano et al., "PCS Number Portability," IEEE, p. 1146-1150, (Sep. 1994).
Bellcore, "Signaling Transfer Point (STP) Generic Requirements," Bell Communications Research, No. 1, p. ii-xxii, 4-84-J14, (Jun. 1994).
Telcordia Technologies, "GCS Network interface Specification (CCSNIS) Supporting SCCP and TCAP," Bell Communications Research, p. ii-xii, 1-1-C-22, (Mar. 1994).
Buckles, "Very High Capacity Signaling Trnsfer Point for Intelligent Network Servcies," DSC Communciations Corporation, p. 1308-1311, (1988).
"Diameter Overview," referenced from www.ulticom.com/html/products/signalware-diameter-reference-guide.asp (Publication date unknown).
"Chapter 1: Overview," SS7 Port Adapter Installation and Configuration, pp. 1-1-1-8 (Publication Date Unknown).
"Configuring ITP Basic Functionality," IP Transfer Point, Cisco IOS Release 12.2(4)MB12, pp. 31-50 (Publication Date Unknown).
"Configuring ITP Optional Features," IP Transfer Point, Cisco IOS Release 12.294)MB12, pp. 65-136 (Publication Date Unknown).
"Configuring M3UA and SUA SS7 Over IP Signaling Gateways," IP Transfer Point, Cisco IOS Release 12.2(4)MB13, pp. 51-66 (Publication Date Unknown).
"Configuring M3UA and SUA SS7 Over IP Signaling Gateways," IP Transfer Point, Cisco IOS Release 12.2(4)MB10, pp. 49-62 (Publication Date Unknown).
Notice of Allowance and Fee(s) Due for U.S. Appl. No. 13/412,352 (May 28, 2013).
Extended European Search Report for European Application No. 07753190.3 (Feb. 22, 2013).
First Examination Report for Indian Application No. 3231/CHENP/2008 (Jan. 2, 2013).
Notice of Allowance and Fee(s) Due for U.S. Appl. No. 13/205,184 (Nov. 1, 2012).
Non-Final Official Action for U.S. Appl. No. 13/412,352 (Oct. 26, 2012).
Notification of Transmittal of the International Search Report and the Written Opinion of the International Searching Authority, or the Declaration for International Patent Application No. PCT/US2012/027736 (Jun. 12, 2012).
Communication pursuant to Article 94(3) EPC for European Application No. 05 724 466.7 (Apr. 10, 2012).
First Office Action for Chinese Patent Application No. 200780051876.7 (Mar. 7, 2012).
Communication under Rule 71(3) EPC for European Application No. 06 844 747.3 (Jul. 19, 2011).
Notice of Allowance for Chinese Patent Application No. 200780017383.1 (Jun. 24, 2011).
Extended European Search Report for European Application No. 05724466.7 (Jun. 20, 2011).
First Office Action for Chinese Patent Application No. 200780017383.1 (Dec. 31, 2010).
Chinese Official Action for Chinese Patent Application No. 200680051295.9 (Dec. 24, 2010).
Notice of Allowance and Fee(s) Due for U.S. Appl. No. 11/807,691 (Dec. 23, 2010).
Notice of Allowance and Fee(s) Due for U.S. Appl. No. 11/291,502 (Oct. 5, 2010).
Notice of Allowance and Fee(s) Due for U.S. Appl. No. 10/405,859 (Aug. 5, 2010).
Communication Pursuant to Article 94(3) EPC for European Application No. 06844747.3 (May 11, 2010).
Notice of Allowance and Fee(s) Due for U.S. Appl. No. 10/405,859 (Mar. 9, 2010).
Final Official Action for U.S. Appl. No. 11/291,502 (Feb. 4, 2010).
Final Official Action for U.S. Appl. No. 11/807,691 (Dec. 7, 2009).
Official Action for U.S. Appl. No. 10/405,859 (Aug. 3, 2009).
Communication pursuant to Article 94(3) EPC for European application No. 06844747.3 (Jul. 28, 2009).
Official Action for U.S. Appl. No. 11/291,502 (May 13, 2009).
Supplementary European Search Report for European Application No. 06844747.3 (Apr. 24, 2009).
Non-Final Official Action for U.S. Appl. No. 11/807,691 (Apr. 2, 2009).
Final Official Action for U.S. Appl. No. 10/405,859 (Jan. 6, 2009).
Declaration of Gregory A. Hunt (Dec. 15, 2008).
Communication of European publication number and information on the application of Article 67(3) EPC for European Application No. 07753190.3 (Nov. 12, 2008).
Notification Concerning Transmittal of International Preliminary Report on Patentability for International Application No. PCT/US2006/046108 (Oct. 2, 2008).
Notification of Transmittal of the International Search Report and the Written Opinion of the International Searching Authority, or the Declaration for International Application No. PCT/US2006/046108 (Sep. 9, 2008).
Notification of Transmittal of the International Search Report and the Written Opinion of the International Searching Authority, or the Declaration for International Application No. PCT/US07/06543 (Aug. 29, 2008).
Final Official Action for U.S. Appl. No. 11/807,691 (Aug. 21, 2008).
Interview Summary for U.S. Appl. No. 10/405,859 (Aug. 20, 2008).
Notice of Allowance and Fee(s) Due for U.S. Appl. No. 11/724,590 (Aug. 14, 2008).
Communication of European publication number and information on the application of Article 67(3) EPC for Application No. 06844747.3 (Jul. 23, 2008).
Notification of Transmittal of the International Search Report and the Written Opinion of the International Searching Authority, or the Declaration for International Application No. PCT/US07/26232 (May 15, 2008).
Interview Summary for U.S. Appl. No. 11/807,691 (Apr. 11, 2008).
Official Action for U.S. Appl. No. 10/405,859 (Mar. 17, 2008).

(56) References Cited

OTHER PUBLICATIONS

Restriction Requirement for U.S. Appl. No. 10/405,859 (Feb. 6, 2008).
Non-Final Official Action for U.S. Appl. No. 11/807,691 (Dec. 21, 2007).
Notification of Transmittal of the International Search Report and the Written Opinion of the International Searching Authority, or the Declaration for International Application No. PCT/US06/41449 (Jun. 20, 2007).
Notice of Allowance and Fee(s) Due for U.S. Appl. No. 11/070,940 (May 11, 2007).
Final Official Action for U.S. Appl. No. 11/070,940 (Mar. 9, 2007).
Notification of European publication number and Information on the application of Article 67(3) EPC for European Application No. 05724466.7 (Nov. 22, 2006).
Notification of Transmittal of the International Search Report and the Written Opinion of the International Searching Authority, or the Declaration in International Application No. PCT/US05/06926 (Oct. 11, 2006).
Non-Final Official Action for U.S. Appl. No. 11/070,940 (Jun. 20, 2006).
"Prepaid vs. Number Portability," Power Point presentation (publication date unknown; electronic file creation date Jul. 29, 2003.).
"Description of the Sms Prepaid Relay Function Implemented in the SRF Equipment," edition 0.1, unpublished, dated Jul. 2001.
Final Office Action for U.S. Appl. No. 12/732,178 (Jun. 17, 2013).
Applicant-Initiated Interview Summary for U.S. Appl. No. 13/035,656 (May 17, 2013).
Final Office Action for U.S. Appl. No. 13/035,656 (Feb. 12, 2013).
Commonly-assigned, co-pending U.S. Appl. No. 13/752,369 for "Methods, Systems, and Computer Readable Media for Tracking and Communicating Long Term Evolution (LTE) Handset Communication Capability," (Unpublished, filed Jan. 28, 2013.)
Non-Final Office Action for U.S. Appl. No. 12/732,178 (Nov. 6, 2012).
Non-Final Official Action for U.S. Appl. No. 13/035,656 (Aug. 23, 2012).
Calhoun et al., "Diameter Base Protcol," Network Working Group, RFC 3588 (Sep. 2003).

\* cited by examiner

METHODS, SYSTEMS, AND COMPUTER READABLE MEDIA FOR MODIFYING A DIAMETER SIGNALING MESSAGE DIRECTED TO A CHARGING FUNCTION NODE

PRIORITY CLAIM

This application claims the benefit of U.S. Provisional Patent Application Ser. No. 61/426,841 filed Dec. 23, 2010; the disclosure of which is incorporated herein by reference in its entirety.

TECHNICAL FIELD

The subject matter described herein relates to processing Diameter signaling messages directed to charging function nodes. More specifically, the subject matter relates to methods, systems, and computer readable media for modifying a Diameter signaling message directed to a charging function node.

BACKGROUND

At present, online charging systems (OCS) enable telecommunications service providers to charge customers for service usage in real time. Online charging systems may employ flow-based charging algorithms and filters to determine subscriber charges for service data flows. For example, the provisioned OCS algorithms utilize information contained in received Diameter based signaling messages, such credit control request (CCR) messages, to determine the appropriate charges incurred by a mobile subscriber for using an online service. The CCR messages received at an OCS typically contain a limited amount of information, thereby limiting the effectiveness of the algorithms that use subscriber related data as input. Notably, more sophisticated OCS algorithms can be implemented to charge customers more effectively if additional data related to the mobile subscriber is provided to the OCS.

Accordingly, a need exists for improved methods, systems, and computer readable media for modifying a Diameter signaling message directed to a charging function node.

SUMMARY

Methods, systems, and computer readable media for modifying a Diameter signaling message directed to a charging function node are disclosed. One exemplary method comprises receiving, at a Diameter routing node, a Diameter signaling message that is associated with a mobile subscriber and is directed to a destination charging function node. The method further includes accessing mobile subscriber related information that is associated with the Diameter signaling message. The method also includes modifying the Diameter signaling message to include the mobile subscriber related information and routing the modified Diameter message to the destination charging function node.

As used herein, the term "node" refers to a physical computing platform including one or more processors and associated memory.

The subject matter described herein may be implemented in software in combination with hardware and/or firmware. For example, the subject matter described herein may be implemented in software executed by a processor. In one exemplary implementation, the subject matter described herein for modifying a Diameter signaling message directed to a charging function node may be implemented using a non-transitory computer readable medium to having stored thereon executable instructions that when executed by the processor of a computer control the processor to perform steps. Exemplary non-transitory computer readable media suitable for implementing the subject matter described herein include chip memory devices or disk memory devices accessible by a processor, programmable logic devices, and application specific integrated circuits. In addition, a computer readable medium that implements the subject matter described herein may be located on a single computing platform or may be distributed across plural computing platforms.

BRIEF DESCRIPTION OF THE DRAWINGS

The subject matter described herein will now be explained with reference to the accompanying drawings of which.

DETAILED DESCRIPTION

The subject matter described herein includes methods, systems, and computer readable media for modifying a Diameter signaling directed to a charging function node. Although the present subject matter described herein is described as being implemented at a Diameter signaling router (DSR), any node that is configured to route Diameter messages (e.g., a Diameter routing agent (DRA), a Diameter proxy agent (DPA), a Diameter relay agent, or a Diameter translation agent) may be utilized without departing from the scope of the subject matter. In one embodiment, a DSR receives a Diameter based signaling message directed to a charging function node, such as an online charging system (OCS) node or offline charging system (OFCS) node. The received Diameter signaling message may be sent from another network element, such as signaling transfer point (STP) or a mobility management entity (MME). Upon receiving the Diameter signaling message, the DSR may be configured to add mobile subscriber related information to the message before forwarding the modified message to the charging function node. The mobile subscriber related information may be accessed or obtained from local or remote databases that have been provisioned with the mobile subscriber related information from previously received signaling messages.

Figure 1:
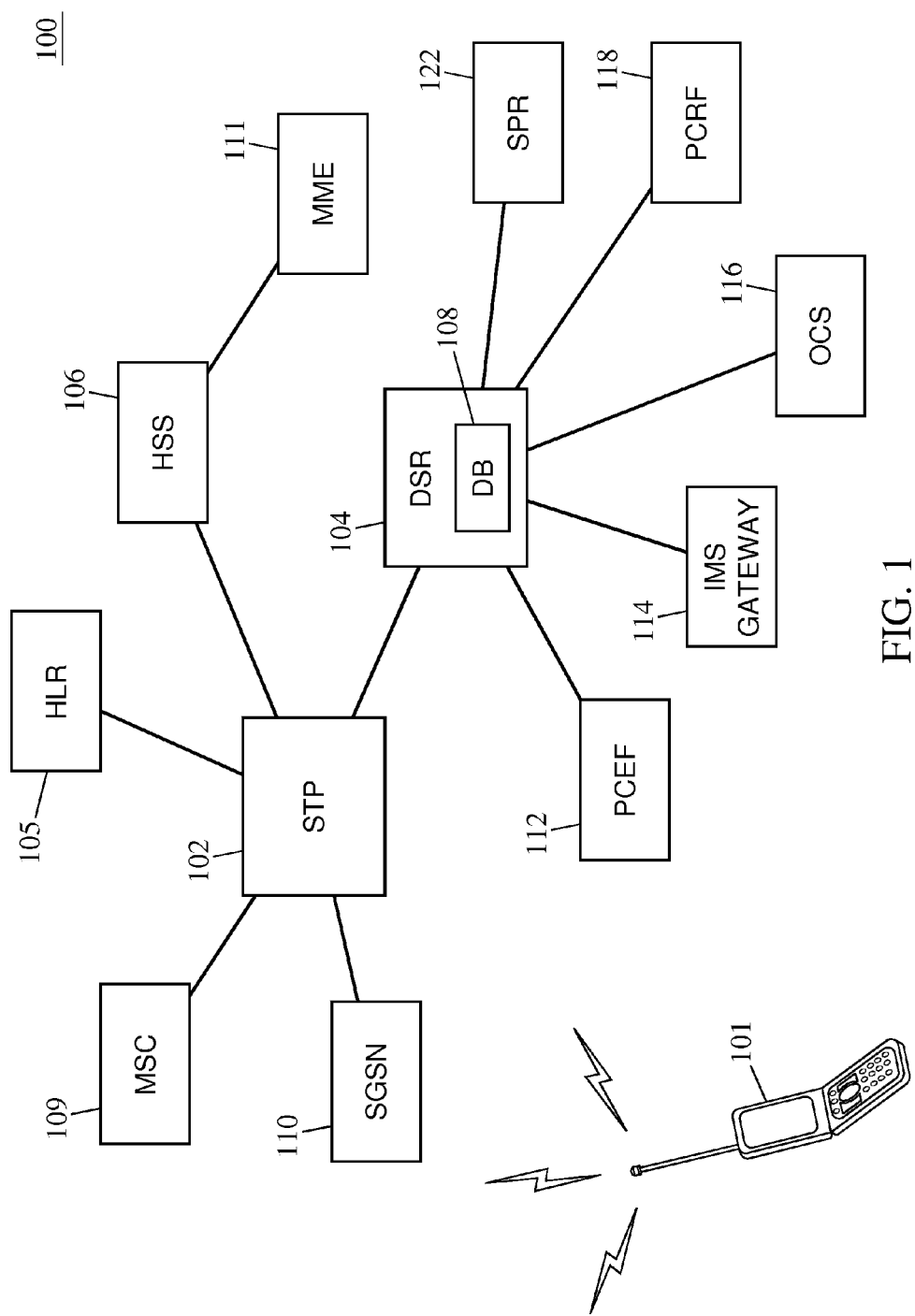
FIG. 1 is a block diagram illustrating a system for modifying a Diameter signaling message directed to a charging function node according to an embodiment of the subject matter described herein.

FIG. 1 depicts an exemplary system 100 that includes a number of various mobile network elements that may be utilized for modifying a Diameter signaling message directed to a charging function node. In one embodiment, system 100 includes a signaling transfer point (STP) 102 that is configured to route Signaling System 7 (SS7) signaling messages, such as Mobile Application Part (MAP) messages. In one embodiment, STP 102 may be configured to extract/copy mobile subscriber related information such as mobile subscriber identification information (e.g., IMSI, directory number, and GUTI information) from received MAP update location request messages and MAP update General Packet Radio Service (GPRS) location request messages sent by network nodes. For example, the sending network nodes may include a mobile subscriber center (MSC) 109 or a serving GPRS support node (SGSN) 110 that supports a mobile subscriber device 101 (e.g., a mobile phone). STP 102 may also be configured to extract and/or copy mobile subscriber related information such as serving network information, e.g., serving MSC address information, visitor location register (VLR) number information, SGSN address information, and SGSN number information, from a received MAP signaling message.

In one embodiment, the mobile subscriber related information (e.g., serving network information) copied at STP 102 is communicated to a Diameter routing node, such as Diameter signaling router (DSR) 104. DSR 104 may also be configured to store/cache the serving network information that is provided by STP 104. For example, STP 102 (or an application or subsystem associated with STP 102) may be configured to send an unsolicited update or notification signaling message that includes the copied serving network information associated with a mobile subscriber to DSR 104. DSR 104 may then store the received serving network information in a local cache or database 108. In an alternate embodiment, DSR 104 may send a query message to STP 102 (or an application or subsystem associated with STP 104) to request mobile subscriber related information such as the serving MSC address, VLR number, SGSN address, SGSN number information, or any other serving network information associated with a mobile subscriber. DSR 104 may also send a query message In one embodiment, DSR 104 may translate the serving network information into PLMN related identifiers that may be utilized by other network nodes. For example, DSR 104 may translate the serving MSC address, VLR number, SGSN address, SGSN number information into associated and properly formatted mobile country code (MCC) and mobile network code (MNC) identifiers that are recognized by other network nodes in a long term evolution (LTE) network, such as a charging function node, such as online charging system (OCS) node 116. In one embodiment, OCS node 116 may utilize the MCC and MNC information to respond to credit control request (CCR) messages sent by policy and charging enforcement function (PCEF) nodes, e.g., PCEF 112. As used herein, the term online charging refers to real-time management of pricing and payment processes conducted by a network charging function node (such as OCS node 116). Online charging systems are aware of each mobile subscriber's service use and account balance in real time. In one embodiment, an OCS node 116 may be configured to customize the pricing, service delivery and marketing communication for each mobile subscriber based on the subscriber usage and current balances. Although FIG. 1 depicts and OCS node 116, other charging function nodes such as, an offline charging system (OFCS) node may be utilized without departing from the scope of the present subject matter.

In one embodiment, OCS node 116 is configured to manage all subscriber types and service types and provides network service providers with online charging and online control capabilities for any network service utilized by mobile subscribers. An OCS node 116 may be provisioned with algorithms that comprise various charging rules and service flow filters. The service flow filters to identify and process packets associated with a particular service data flow. Based on the information related to the subscriber (e.g., mobile subscriber identifier, visited network identification information, etc.), the OCS algorithms in OCS node 116 may use the charging rules to determine how a mobile subscriber is to be charged (e.g., charging for distinct media streams within single PDP context) for a given service. In one embodiment, OCS node 116 may receive Diameter based request messages from PCEF node 112. For example, PCEF node 112 may send credit control request (CCR) messages to request charging rules associated with a mobile subscriber. In another embodiment, OCS node 116 may communicate credit control requests and answers to IMS network nodes capable of conducting online charging (e.g., an application server, a media resource function controller (MRFC), and a serving-call session control function (S-CSCF) via IMS gateway 114).

In one embodiment, DSR 104 may store the MCC and MNC identifier information, or any other serving network information in a local cache or database 108 that is integrated with or accessible to DSR 104. In another embodiment, DSR 104 may communicate the mobile subscriber related information (e.g., subscriber identifier information and/or serving network information) to a subscriber profile repository (SPR) node 122 (or some other database application or database repository) where the current MCC/MNC information is stored along with the mobile subscriber information. DSR 104 may also be configured to later query SPR node 122 to obtain the stored serving network information.

In one embodiment, DSR 104 is configured to route Diameter messages between various Diameter nodes on various Diameter interfaces including, but not limited to, the Gy, Ro, Rf, and S6a interfaces. DSR 104 is further configured to monitor Diameter signaling message traffic communicated between a PCEF node (e.g., such as a gateway GPRS support node (GGSN), a public data network (PDN) gateway, and the like) and OCS node 116 via a Gy interface. In one embodiment, DSR 104 is configured to monitor, observe, and/or intercept a Gy interface signaling message, such as a Diameter Credit Control Request (CCR) message associated with a subscriber, sent from a PCEF 112 to OCS node 116. DSR 104 may also be configured to modify the Diameter CCR message to include one or more of the serving MSC address, VLR number, SGSN address, SGSN number, MCC identifier, or MNC identifier information. The modified CCR message is then routed to the destination OCS node 116.

In an alternate embodiment, DSR 104 is configured to monitor Diameter signaling message traffic communicated between a mobility management entity (MME) 111 and home subscriber server (HSS) 106 via an S6a interface and to extract information from the Diameter signaling messages (e.g., update location request messages) that identify a mobile subscriber and MCC and MNC information associated with the current PLMN serving mobile device 101.

Figure 2:
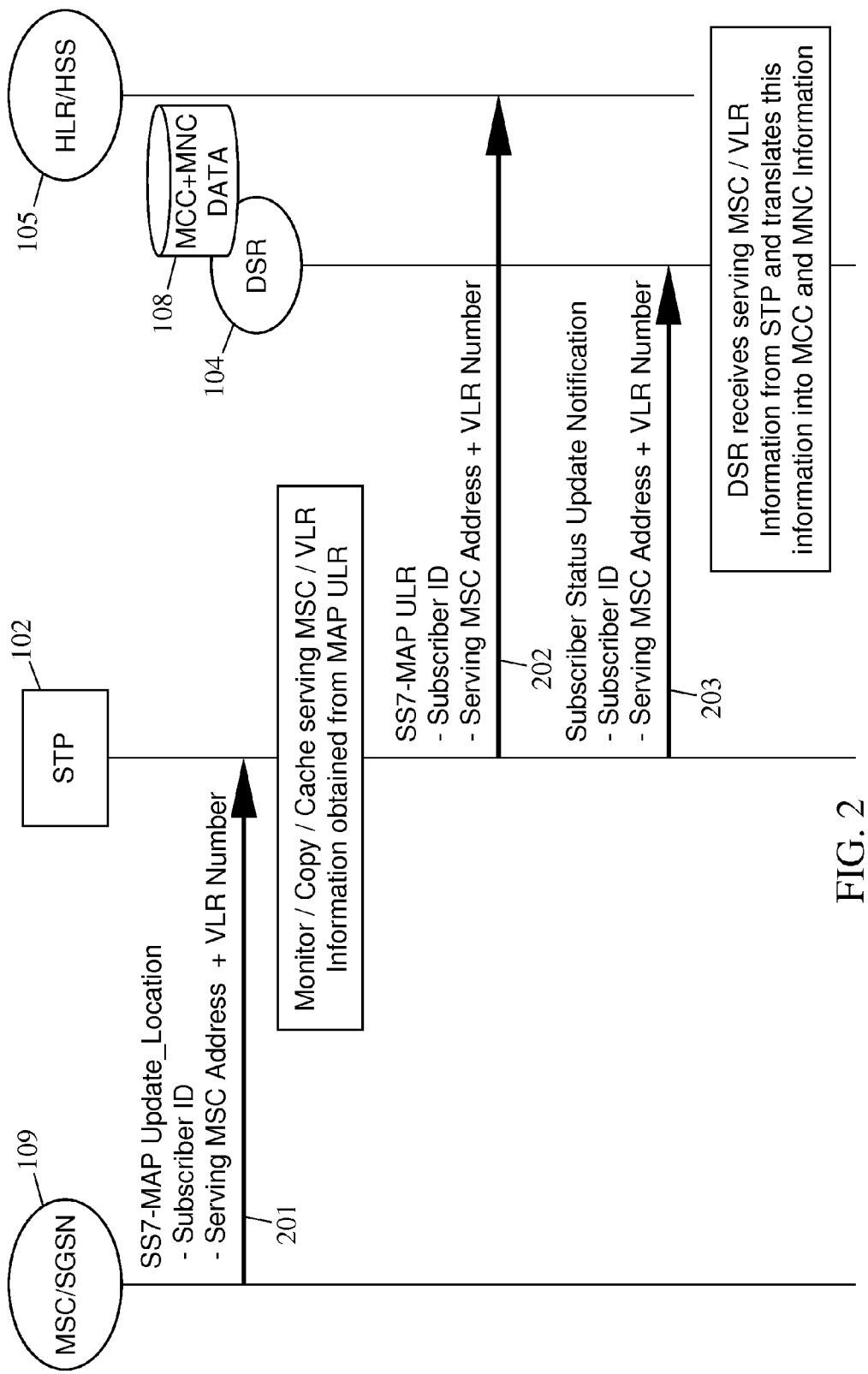
FIG. 2 is a message sequence diagram illustrating the obtaining of serving network information from an update location signaling message according to an embodiment of the subject matter described herein.

FIGS. 2 through 7 illustrate various exemplary messaging sequences for modifying a Diameter signaling message directed to a charging function that utilize the network elements depicted in FIG. 1. For example, FIG. 2 is a message sequence diagram illustrating the process of obtaining serving network information from an update location request (ULR) signaling message at a network routing node according to an embodiment of the subject matter described herein. In FIG. 2, MSC 109 may forward an SS7 MAP update location request signaling message 201 (which was originally received from a mobile subscriber device, e.g., a cellular phone) to a network routing node, such as STP 102. In one embodiment, the SS7 MAP update location request message may include mobile subscriber identification information, such as international mobile subscriber identity (IMSI) information and/or directory number (DN) information, location information (e.g., serving location area code information, serving cell identification information, mobile subscriber geo-location coordinate information, such as global positioning system coordinate information, etc.), and serving network information that may correspond to a serving network element that serves/supports a mobile device associated with a mobile subscriber. Exemplary serving network information may include serving network element identification information contained in update location request signaling message 201, such as a serving MSC address and/or a visitor location register (VLR) number associated with a mobile subscriber.

In an alternate embodiment, signaling message 201 may instead include an SS7 MAP Update GPRS Location signaling message originating from SGSN 110. The SS7 MAP update GPRS location request signaling message sent from SGSN 110 may also include mobile subscriber identification information, location information and serving network element identification information, such as a serving SGSN address and/or an SGSN number.

After receiving the update location request signaling message 201, STP 102 may obtain the mobile subscriber identification information and the serving network information from update location request message 201. STP 102 may then copy and/or cache the serving network information (e.g., the MSC and VLR numbers associated with the network visited by the mobile subscriber) and/or location information obtained from the MAP update location message. In an alternate embodiment, STP 102 may be configured to receive an MAP update GPRS location request message and may extract and store the SGSN number information from the signaling message before the update location request message is routed to HLR 102 or HSS 106. FIG. 2 further depicts STP 102 transmitting a subscriber status update notification message 203 to DSR 104. For example, message 203 may include the mobile subscriber identification information (e.g., IMSI identification information or DN identification information), location information, and serving network information (i.e., serving network element identification information), such as a serving MSC address information and/or a VLR number. In an alternate embodiment, message 203 may include a serving SGSN address and/or an SGSN number.

Figure 3:
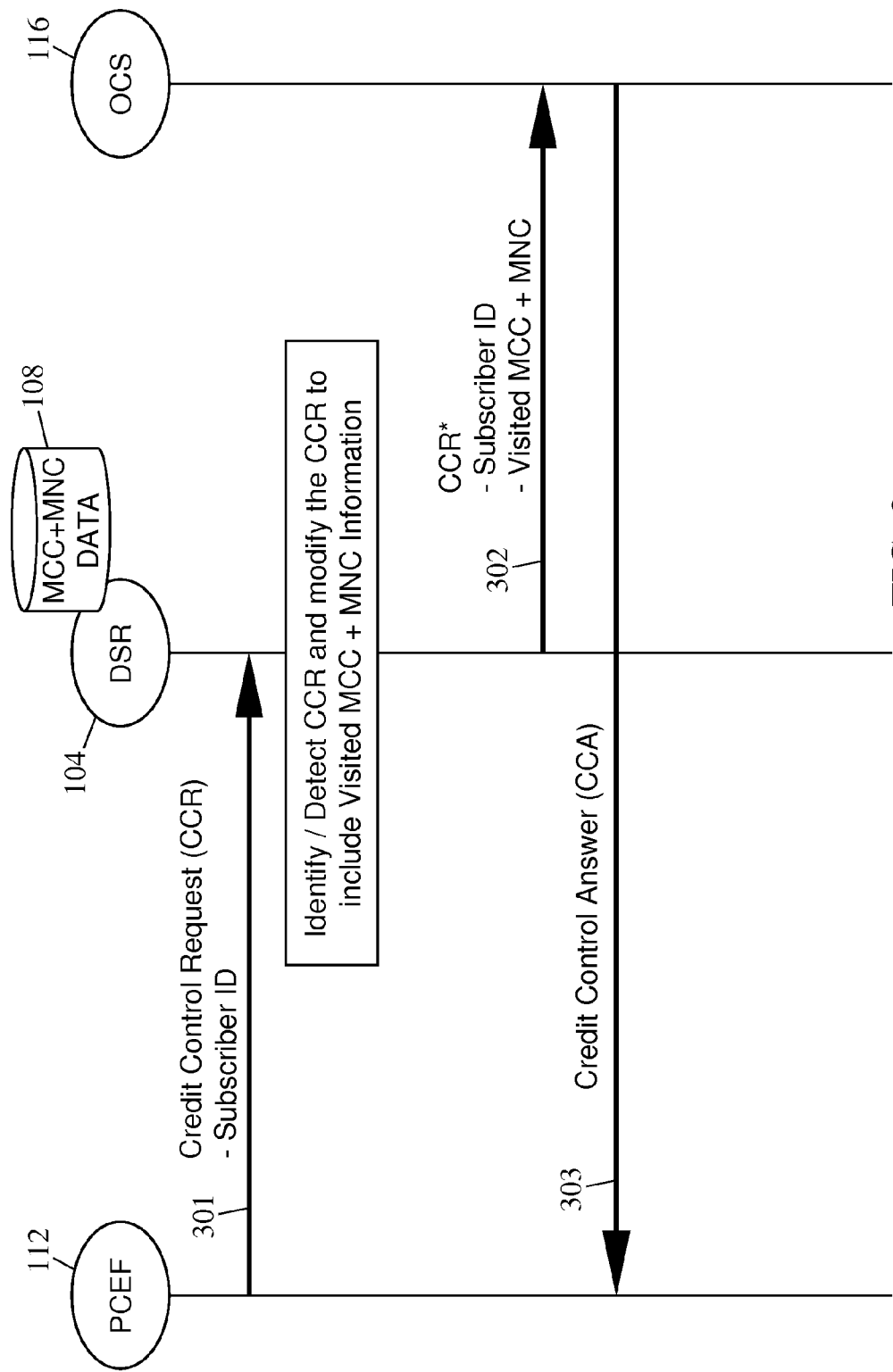
FIG. 3 is a message sequence diagram illustrating the modifying of a Diameter signaling message directed to a charging function node according to an embodiment of the subject matter described herein.

Upon receiving the serving network information from STP 102, DSR 104 may translate the MSC address and VLR number information into properly formatted mobile country code (MCC) and mobile network code (MNC) identification information. The MCC and MNC data may be stored by DSR 104 in a local database 108 for later use. For example, FIG. 3 illustrates a message sequence diagram that depicts the process of modifying a Diameter signaling message at a Diameter outing node, such as DSR 104 using the aforementioned stored MCC and MNC data. In FIG. 3, PCEF 112 may send a Diameter signaling message associated with a mobile subscriber to DSR 104. In one embodiment, PCEF 112 may be a GGSN or a PDN gateway. In FIG. 3, the Diameter signaling message is a credit control request (CCR) message 301, which contains a mobile subscriber identifier (e.g., an IMSI or DN), that may be received/intercepted by DSR 104 via a Gy interface, a Ro interface, or an Rf interface.

In one embodiment, DSR 104 may identify or detect CCR message 301 and modify CCR message 301 to include visited MCC and MNC identifier information and/or location information. Notably, the MCC and MNC identifier data may be derived from or include information that was previously obtained (see FIG. 2) and stored in database 108. DSR 102 may be configured to subsequently route a modified CCR message 302 to an OCS node 116 via a Gy interface, a Ro interface, or an Rf interface. After receiving modified CCR message 302, OCS node 116 may utilize the subscriber identifier and visited MCC and MNC information contained in message 302 to generate a credit control answer (CCA) message 303. CCA message 303 may then be sent by OCS node 116 to the originating PCEF 112. In an alternate embodiment, instead of a PCEF node, an IMS gateway 114 and/or an S-CSCF may be used to communicate with DSR 104 by sending CCR message 301 over a Ro interface. In yet another embodiment, an IMS gateway function or an S-CSCF may be used instead of a PCEF node to communicate with DSR 104 by sending CCR message 301 over a Ro interface. In yet another embodiment, a GGSN, a PDN gateway, or a CSCF may be used instead of PCEF node 112 to communicate with DSR 104 by sending CCR message 301 over a Gx/Rx interface. In such an embodiment, DSR 104 may be configured to route the modified CCR message 302 to a PCRF 118 via a Gx/Rx interface instead of OCS node 116. In an alternate embodiment, an originating PCRF node may be used instead of PCEF node 112 to communicate with DSR 104 by sending CCR message 301 over an S9 interface. In such an embodiment, DSR 104 may be configured to route the modified CCR message 302 to a destination PCRF via an S9 interface instead of OCS node 116.

Figure 4:
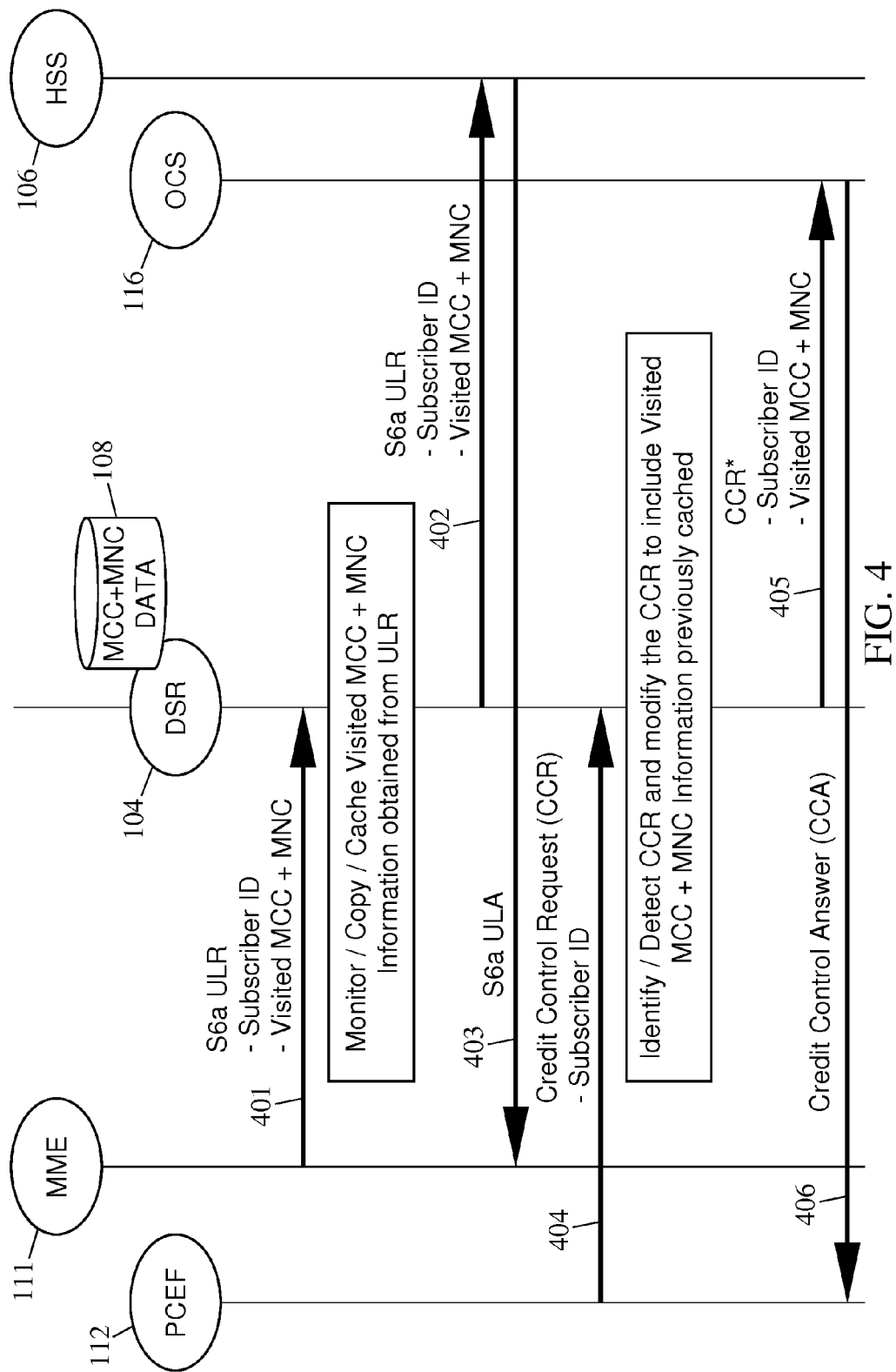
FIG. 4 is a message sequence diagram illustrating the obtaining of serving network information and modifying of a Diameter signaling message with serving network information directed to a charging function node according to an embodiment of the subject matter described herein.

FIG. 4 illustrates a message sequence diagram that depicts the process of modifying a Diameter signaling message directed to a charging function node according to an embodiment of the subject matter described herein. In FIG. 4, MME 111 sends an S6a update location request (ULR) signaling message 401 to a Diameter routing node, such as DSR 104. In one embodiment, S6a ULR message 401 may include mobile subscriber identification information, such as IMSI information, DN information, and/or globally unique temporary identifier (GUTI) information. S6a ULR message 401 may also include visited MCC and MNC information corresponding to a PLMN that serves/supports a roaming mobile device associated with the subscriber as well as location information (e.g., tracking area information, serving cell identification information, global positioning system coordinate information, etc.). Upon receiving ULR message 401, DSR 104 may copy and/or cache (in local database 108) the visited MCC and MNC and/or location information from message 401. Afterwards, ULR message 402 may then be forwarded to the original destination, HSS 106. After receiving ULR message 402 (i.e., message 401 being forwarded) HSS 106 may then respond to the original update location request made by MME 111 with an S6a update location answer (ULA) message 403.

Once the visited MCC and MNC and/or location information is stored in local database 108, PCEF 112 may direct a CRR message 404 that contains a subscriber identifier to OCS node 116 via a Gy or Ro interface. DSR 104 may then identify/detect CRR message 404 and determine if the mobile subscriber identifier contained in CCR message 404 is associated with the previously cached MCC and MNC and/or location information copied from message 401. DSR 104 may then modify CCR message 404 to include the visited MCC and MNC information. In one embodiment, modified CCR message 405 may then be sent by DSR 104 to OCS node 116 via a Gy or Ro interface. Upon receiving modified CCR message 405, OCS node 116 may send a CCA message 406 to PCEF 112 as a response to original CCR message 404.

Figure 5:
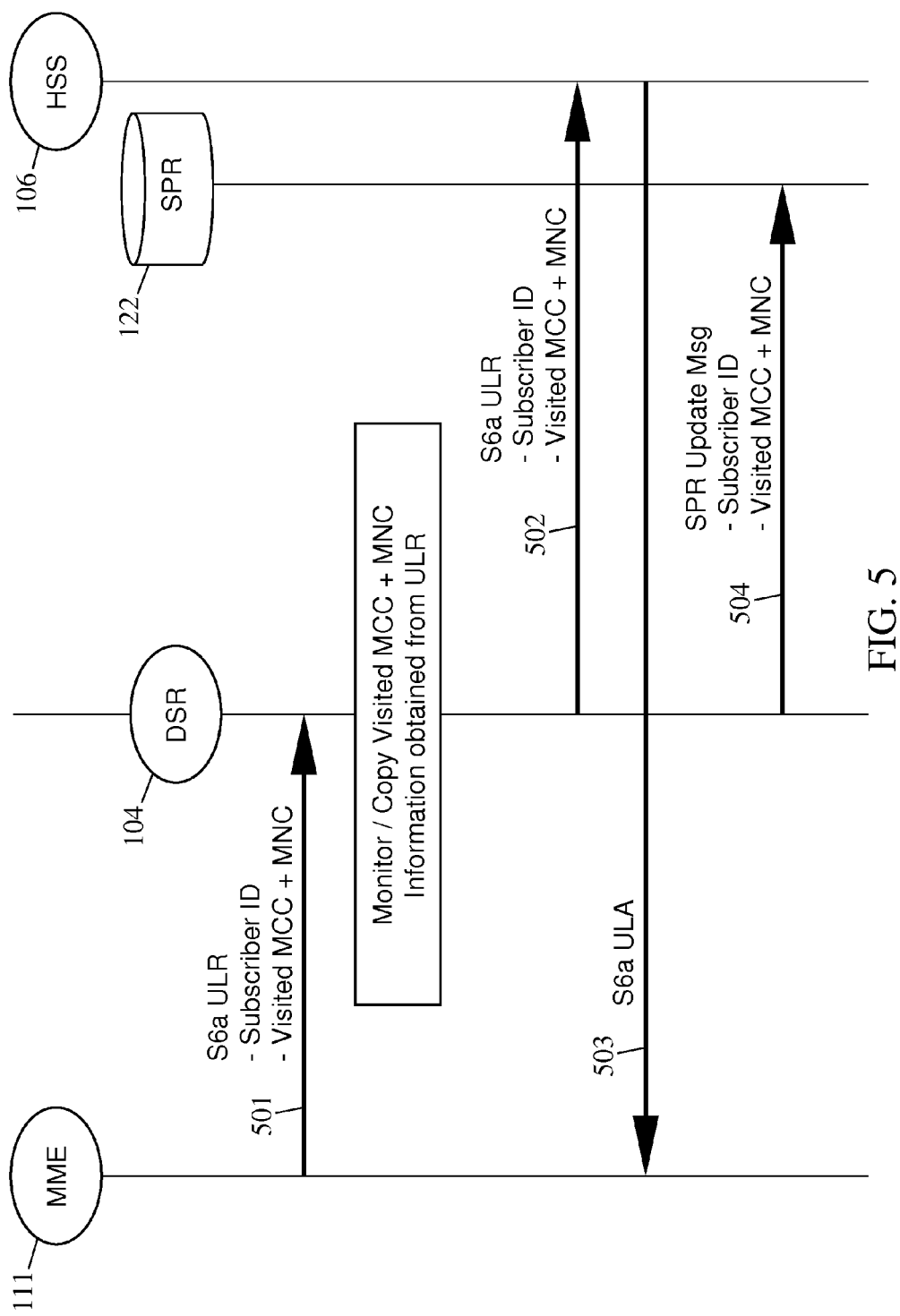
FIG. 5 is a message sequence diagram illustrating the updating of a subscriber profile repository (SPR) node with serving network information according to an embodiment of the subject matter described herein.

FIG. 5 is a message sequence diagram illustrating the updating of a subscriber profile repository (SPR) node with serving network information according to an embodiment of the subject matter described herein. For example, MME 111 sends an S6a update location request (ULR) signaling message 501 to a Diameter routing node, such as DSR 104. In one embodiment, S6a ULR message 501 may include mobile subscriber identification information, such as IMSI information, DN information, and/or GUTI information, and/or location information. S6a ULR message 501 may also include visited MCC and MNC information corresponding to a PLMN that serves/supports a roaming mobile device associated with the mobile subscriber. Upon receiving ULR message 501, DSR 104 may copy the visited MCC and MNC and/or location information from message 501. ULR message 501 may then be forwarded (i.e., shown in FIG. 5 as message 502) to its original destination, HSS 106. After receiving ULR message 502, HSS 106 may then may respond to the original request by to MME 111 by sending an S6a update location answer (ULA) message 503. In one embodiment DSR 104 may also intercept ULA message 503 and extract mobile subscriber related information contained within. DSR 104, may then store the extracted mobile subscriber related information in a local cache or SPR 122.

At some time after copying the visited MCC and MNC and/or location information from ULR message 501, DSR 104 may generate an SPR update message 504. In one embodiment, SPR update message 504 includes mobile subscriber identification information (e.g., IMSI, DN, and/or GUTI information) and the previously copied visited MCC and MNC and/or location information. In one embodiment, DSR 104 may send SPR update message 504 to SPR 122 via a Sp interface or lightweight directory access protocol (LDAP) interface.

Figure 6:
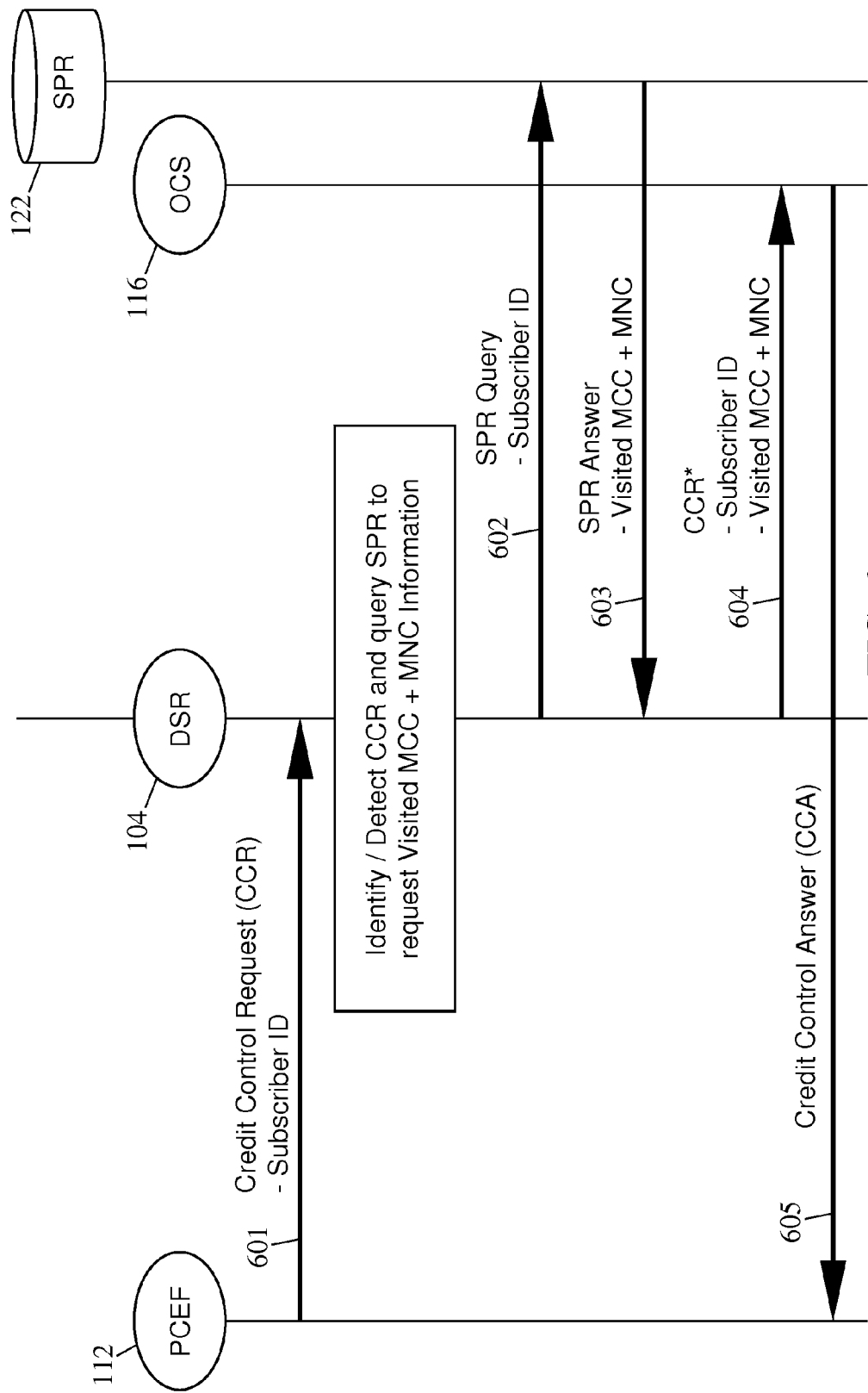
FIG. 6 is a message sequence diagram illustrating modifying a Diameter signaling message with serving network information obtained from a subscriber profile repository node according to an embodiment of the subject matter described herein.

FIG. 6 illustrates a message sequence diagram that depicts the process of modifying a Diameter signaling message directed to a charging function node at DSR 104 using MCC and MNC and/or location information previously stored at SPR 122. In FIG. 6, PCEF 112 may send a Diameter signaling message 601 to DSR 104. In one embodiment, instead of PCEF 112, an IMS gateway function may be responsible for sending the Diameter signaling message 601. In FIG. 6, the Diameter signaling message 601 is a credit control request (CCR) message, which contains a mobile subscriber identifier, which is directed toward OCS node 116. CCR message 601 depicted in FIG. 6 may be received/intercepted by DSR 104 via a Gy interface or a Ro interface. In one embodiment, DSR 104 may identify or detect a CCR message 601 that contains a mobile subscriber identifier associated with MCC and MNC and/or location information stored in SPR 122. DSR 104 may then be configured to send an SPR query message 602 to SPR node 122 via a Sp interface or an LDAP interface. In one embodiment, SPR query message 602 may include the subscriber identification information, such as IMSI, DN, and/or GUTI information. Upon receiving query message 602, SPR 122 generates an SPR answer message 604 that includes the visited MCC and MNC and/or location information associated with the aforementioned subscriber identification information. In one embodiment, SPR answer message 604 is sent to DSR 104, which may then be configured to modify the CCR message 601 to include visited MCC and MNC identifier and/or location information previously stored in SPR node 122. DSR 102 may be configured to subsequently route a modified CCR message 606 to an OCS node 116 via a Gy interface or a Ro interface. After receiving modified CCR message 606, OCS node 116 may then utilize the subscriber identifier and visited MCC and MNC and/or location information in message 302 to generate a credit control answer (CCA) message 608. CCA message 608 may then be sent by OCS node 116 to the originating PCEF 112. In an alternate embodiment, instead of a PCEF 112, an IMS gateway function 114 may be utilized to communicate with DSR 104 by sending CCR message 601 over a Gy or Ro interface.

Figure 7:
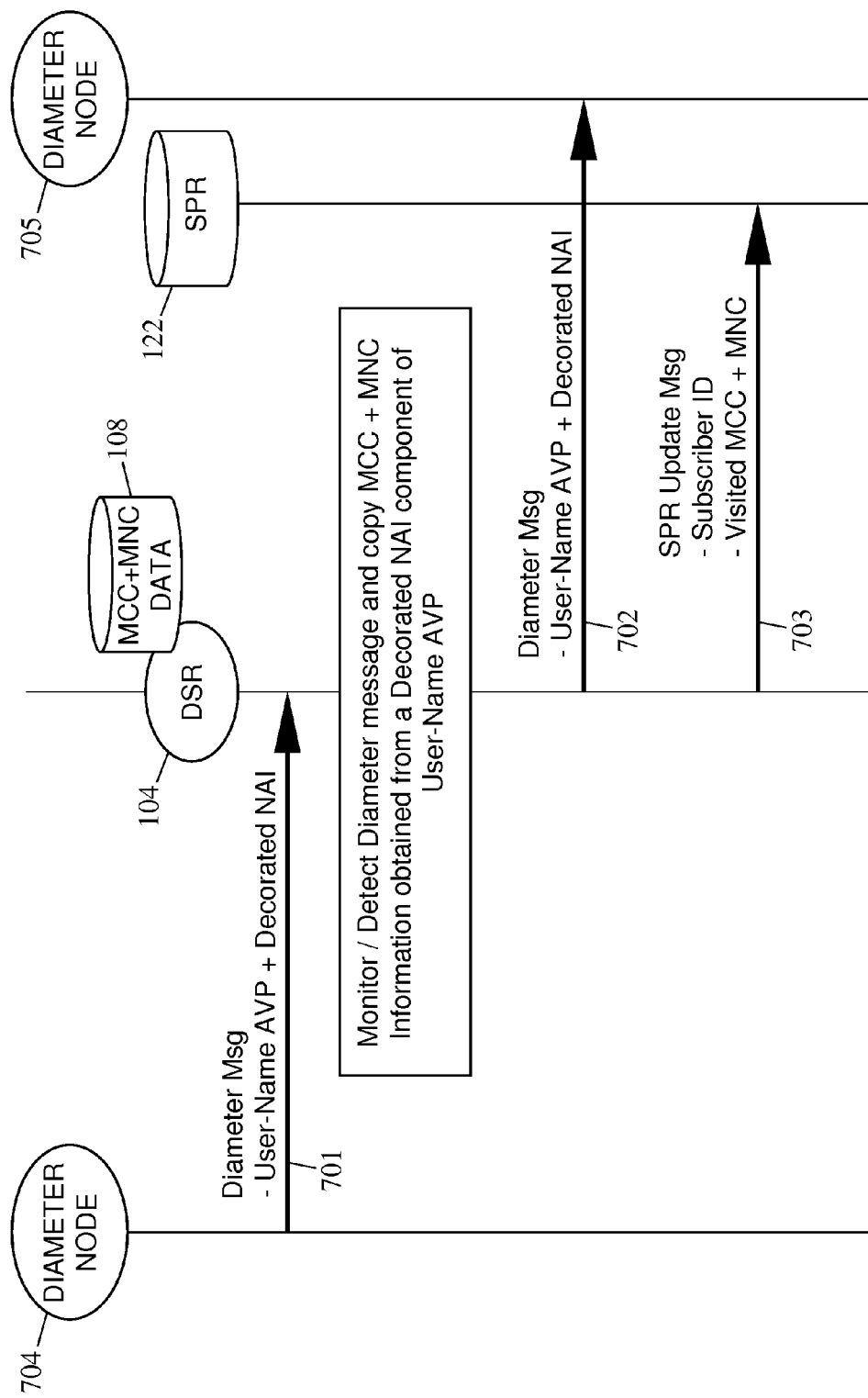
FIG. 7 is a message sequence diagram illustrating the obtaining of serving network information from a network access identifier in a Diameter signaling message according to an embodiment of the subject matter described herein.

FIG. 7 illustrates a message sequence diagram that depicts the process of modifying a Diameter message directed to a charging function node at DSR 104 using MCC and MNC data previously stored at database 108. In FIG. 7, a first Diameter node 704 may direct a Diameter signaling message 701 to a second Diameter node 705 via DSR 104. In one embodiment, first Diameter node 704 may be at least one of a Diameter signaling router (DSR), a Diameter routing agent (DRA), a Diameter proxy agent (DPA), and a Diameter relay agent. In FIG. 7, the Diameter message 701 includes a User-Name Attribute Value Pair (AVP) and a decorated Network Access Identifier (NAI). Diameter signaling message 701 may be received or intercepted by DSR 104. In one embodiment, DSR 104 may identify or detect Diameter signaling message 701 and subsequently copy MCC and MNC information obtained from the decorated NAI component of the User-Name AVP. For example, the copied MCC and MNC information may be stored in database 108. Alternatively, the MCC and MNC information may be stored in SPR node 122.

In one embodiment, DSR 104 forwards Diameter signaling message 702 to second Diameter node 705. After storing the MCC and MNC information, DSR generates an SPR update message 703, which includes subscriber identifier information (e.g., IMSI, DN, and/or GUTI information) and the visited MCC and MNC information. In one embodiment, SPR update message 703 is sent to SPR 122 via a Sp interface or LDAP interface. DSR 104 may issue an SPR request message as shown in FIG. 6 in order to obtain visited MCC and MNC information associated with a particular subscriber identifier for modifying a Diameter signaling message, such as a subsequent CCR request message.

Figure 8:
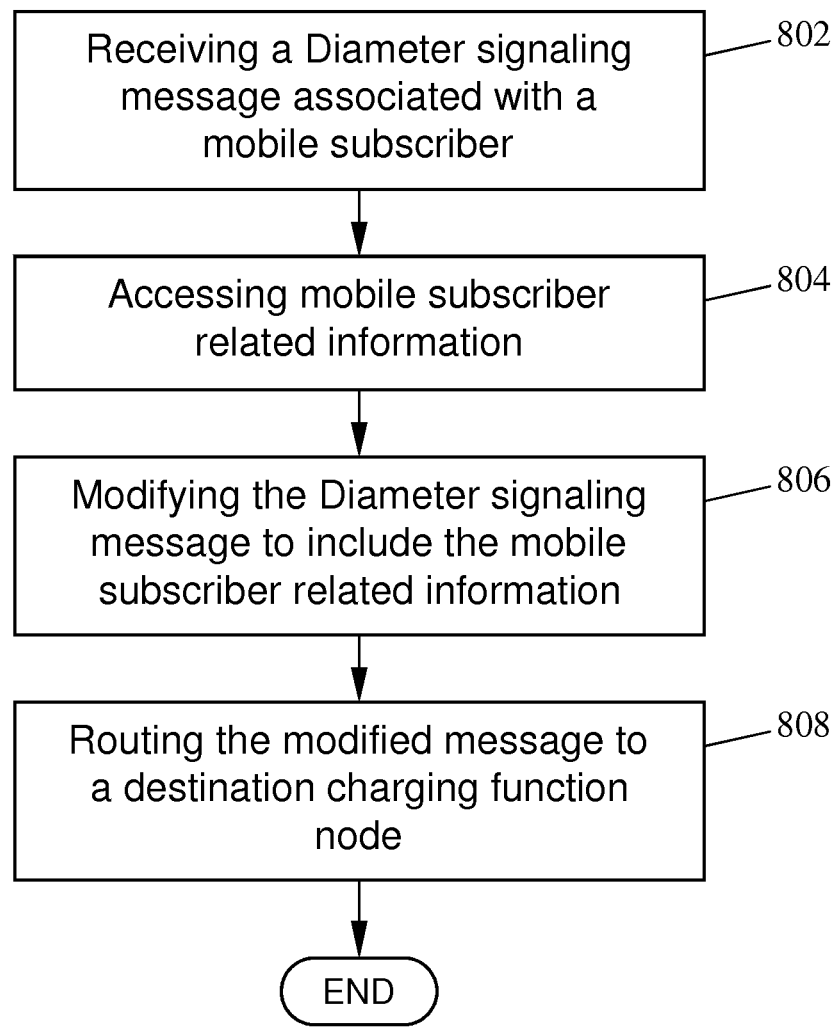
FIG. 8 is a flow chart illustrating a process for modifying a Diameter signaling message directed to a charging function node according to an embodiment of the subject matter described herein.

FIG. 8 is a flow chart illustrating a process 800 for modifying a Diameter signaling message directed to a charging function node according to an embodiment of the subject matter described herein. In block 802, a Diameter signaling message associated with a mobile subscriber is received. In one embodiment, DSR 104 receives a Diameter based message, such as a CCR message, from a Diameter based node, such as PCEF 112. The Diameter based message may be addressed to or directed toward an original destination, such as a charging network function.

In block 804, mobile subscriber related information is accessed. In one embodiment, DSR 104 accesses previously obtained and cached mobile subscriber related information. For example, DSR 104 may access a local cache 108 to obtain previously stored mobile subscriber related information (e.g., visited MCC and MNC and/or location information). Similarly, DSR 104 may send a query message to an external database storage node (e.g., an HSS 106 or an SPR 122) or a signaling routing node (e.g., STP 102) to request mobile subscriber related information. In yet another embodiment, DSR 104 may intercept a signaling message containing mobile subscriber related information sent by HSS 106.

In block 806, the Diameter signaling message is modified to include the mobile subscriber related information. In one embodiment, DSR 104 is configured to insert the obtained/accessed mobile subscriber related information, such as visited MCC and MNC and/or location information, into the received Diameter signaling message, such as a CCR message.

In block 808, the modified Diameter signaling message is routed to a destination charging function node. In one embodiment, DSR 104 is configured to route the modified CCR message containing the inserted mobile subscriber related information to the original destination, i.e., the charging function node (e.g., an OCS or OFS).

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for modifying a Diameter signaling message directed to a charging function node, the method comprising:
   receiving, at a Diameter routing node, a Diameter signaling message that is associated with a mobile subscriber and is directed to a destination charging function node;
   accessing mobile subscriber related information that is associated with the Diameter signaling message;
   modifying the Diameter signaling message to include the mobile subscriber related information; and
   routing the modified Diameter message to the destination charging function node.

2. The method of claim 1 wherein the Diameter routing node includes at least one of: a Diameter signaling router (DSR), a Diameter routing agent (DRA), a Diameter proxy agent (DPA), and a Diameter relay agent.

3. The method of claim 1 wherein the mobile subscriber related information includes at least one of: an international mobile subscriber identity (IMSI), a mobile subscriber directory number (DN), a globally unique temporary identifier (GUTI), a serving MSC address information, visitor location register (VLR) number information, serving General Packet Radio Service (GPRS) support node (SGSN) address information, SGSN number information, visited mobile country code (MCC) information, mobile network code (MNC) information, a user-name attribute value pair (AVP), a decorated network access identifier (NAI), serving location area code information, serving cell identification information, mobile subscriber geo-location coordinate information, and tracking area information.

4. The method of claim 1 wherein accessing mobile subscriber related information comprises obtaining the mobile subscriber related information from a local cache at the Diameter routing node.

5. The method of claim 1 wherein accessing mobile subscriber related information comprising querying a database storage node external to the Diameter routing node to obtain the mobile subscriber related information.

6. The method of claim 1 wherein receiving a Diameter signaling message includes receiving a credit control request (CCR) message.

7. The method of claim 1 wherein receiving a Diameter signaling message includes receiving the Diameter signaling message from at least one of: a policy and charging enforcement function (PCEF) node, a gateway GPRS support node (GGSN), and a public data network (PDN) gateway.

8. The method of claim 1 wherein accessing mobile subscriber related information includes receiving, from a Diameter based node, a Diameter based update location request (ULR) signaling message that contains the mobile subscriber related information.

9. The method of claim 1 wherein accessing the mobile subscriber related information includes receiving, from a Signaling System 7 (SS7) based routing node, an update notification signaling message that contains the mobile subscriber related information.

10. The method of claim 9 wherein the SS7 based routing node initially obtains the mobile subscriber related information from either a received SS7 mobile application part (MAP) update location request message or a received SS7 MAP update General Packet Radio Service (GPRS) location request message.

11. The method of claim 1 wherein accessing mobile subscriber related information includes translating, at the Diameter routing node, the mobile subscriber related information into visited mobile country code (MCC) information and mobile network code (MNC) information associated with the mobile subscriber.

12. The method of claim 1 wherein accessing mobile subscriber related information includes intercepting, from either a home subscriber server (HSS) or home location register (HLR), a signaling message that contains the mobile subscriber related information.

13. The method of claim 1 wherein accessing mobile subscriber related information includes receiving the mobile subscriber related information in response to sending a query signaling message requesting the mobile subscriber related information from either a Signaling System 7 (SS7) based routing node or an external database storage node.

14. The method of claim 1 wherein the destination charging function node includes either an online charging system (OCS) node or an offline charging system (OFCS) node.

15. A system for modifying Diameter signaling messages directed to a destination charging function node, the system comprising:
   a destination charging function node configured to receive Diameter signaling messages; and
   a Diameter routing node configured for receiving a Diameter signaling message that is associated with a mobile subscriber and is directed to the destination charging function node, accessing mobile subscriber related information that is associated with the Diameter signaling message, for modifying the Diameter signaling message to include the mobile subscriber related information, and routing the modified Diameter message to the destination charging function node.

16. The system of claim 15 wherein the Diameter routing node includes at least one of: a Diameter signaling router (DSR), a Diameter routing agent (DRA), a Diameter proxy agent (DPA), and a Diameter relay agent.

17. The system of claim 15 wherein the mobile subscriber related information includes at least one of: an international mobile subscriber identity (IMSI), a mobile subscriber directory number (DN), a globally unique temporary identifier (GUTI), a serving MSC address information, visitor location register (VLR) number information, serving General Packet Radio Service (GPRS) support node (SGSN) address information, SGSN number information, visited mobile country code (MCC) information, mobile network code (MNC) information, a user-name attribute value pair (AVP), a decorated network access identifier (NAI), serving location area code information, serving cell identification information, mobile subscriber geo-location coordinate information, and tracking area information.

18. The system of claim 15 wherein the Diameter routing node is further configured for obtaining the mobile subscriber related information from a local cache at the Diameter routing node.

19. The system of claim 15 wherein the Diameter routing node is further configured for querying a database storage node external to the Diameter routing node to obtain the mobile subscriber related information.

20. The system of claim 15 wherein the Diameter signaling message includes a credit control request (CCR) message.

21. The system of claim 15 wherein the Diameter routing node is further configured for receiving the Diameter signaling message from at least one of: a policy and charging enforcement function (PCEF) node, a gateway GPRS support node (GGSN), and a public data network (PDN) gateway.

22. The system of claim 15 wherein the Diameter routing node is further configured for receiving, from a Diameter based node, a Diameter based update location request (ULR) signaling message that contains the mobile subscriber related information.

23. The system of claim 15 wherein the Diameter routing node is further configured for receiving, from a Signaling System 7 (SS7) based routing node, an update notification signaling message that contains the mobile subscriber related information.

24. The system of claim 23 wherein the SS7 based routing node initially obtains the mobile subscriber related information from either a received SS7 mobile application part (MAP) update location request message or a received SS7 MAP update GPRS location request message.

25. The system of claim 15 wherein the Diameter routing node is further configured for translating the mobile subscriber related information into visited mobile country code (MCC) information and mobile network code (MNC) information associated with the mobile subscriber.

26. The system of claim 15 wherein the Diameter routing node is further configured for intercepting, from either a home subscriber server (HSS) or home location register (HLR), a signaling message that contains the mobile subscriber related information.

27. The system of claim 15 wherein the Diameter routing node is further configured for receiving the mobile subscriber related information in response to sending a query signaling message requesting the mobile subscriber related information from either a Signaling System 7 (SS7) based routing node or an external database storage node.

28. The system of claim 15 wherein the destination charging function node includes either an online charging system (OCS) node or an offline charging system (OFCS) node.

29. A non-transitory computer readable medium comprising computer executable instructions embodied in a computer readable medium that when executed by a processor of a computer control the computer to perform steps comprising:
   receiving, at a Diameter routing node, a Diameter signaling message that is associated with a mobile subscriber and is directed to a destination charging function node;
   accessing mobile subscriber related information that is associated with the Diameter signaling message;
   modifying the Diameter signaling message to include the mobile subscriber related information; and
   routing the modified Diameter message to the destination charging function node.

* * * * *